(12) United States Patent
Bambot et al.

(10) Patent No.: US 11,353,380 B2
(45) Date of Patent: Jun. 7, 2022

(54) APPARATUS FOR FASTER PATHOLOGY

(71) Applicants: Shabbir Bambot, Duluth, GA (US);
Farida Bambot, Duluth, GA (US)

(72) Inventors: Shabbir Bambot, Duluth, GA (US);
Farida Bambot, Duluth, GA (US)

(*) Notice: Subject to any disclaimer, the term of this patent is extended or adjusted under 35 U.S.C. 154(b) by 474 days.

(21) Appl. No.: 14/861,702

(22) Filed: Sep. 22, 2015

(65) Prior Publication Data
US 2016/0084741 A1 Mar. 24, 2016

Related U.S. Application Data

(60) Provisional application No. 62/054,024, filed on Sep. 23, 2014.

(51) Int. Cl.
| | | |
|---|---|---|
| *G01N 1/06* | (2006.01) | |
| *G01N 1/42* | (2006.01) | |
| *G01N 1/28* | (2006.01) | |

(52) U.S. Cl.
CPC .............. *G01N 1/06* (2013.01); *G01N 1/42* (2013.01); *G01N 2001/2873* (2013.01); *Y10S 83/9155* (2013.01); *Y10T 83/8878* (2015.04)

(58) Field of Classification Search
CPC ....... A21C 15/04; B26B 29/06; B26B 29/063; B26B 2029/066; B26D 7/01; G01N 1/06; G01N 1/42; G01N 2001/061; G01N 2001/286; G01N 2001/2873; Y10S 83/9155; Y10T 83/6945; Y10T 83/695; Y10T 83/6955; Y10T 83/696; Y10T 83/6965; Y10T 83/8821; Y10T 83/8878; Y10T 156/1961; Y10T 156/1967; Y10T 156/1972

USPC ............. 83/761–765, 915.5; 62/320, 321; 156/761–763
See application file for complete search history.

(56) References Cited

U.S. PATENT DOCUMENTS

| | | | | |
|---|---|---|---|---|
| 325,722 A | * | 9/1885 | Bausch | B27B 25/10 144/162.1 |
| 618,514 A | * | 1/1899 | Low | B23D 47/04 83/466 |
| 930,686 A | * | 8/1909 | Patterson | B27B 25/10 83/409 |
| 3,220,290 A | * | 11/1965 | Shandon | G01N 1/06 83/171 |
| 3,261,600 A | * | 7/1966 | Horn | G01N 1/06 269/277 |

(Continued)

OTHER PUBLICATIONS

H. Lubatschowski, "Laser Microtomy: Opening a New Feasibility for Tissue Preparation" *Optik & Photonik* No. 2: pp. 49-51 (Jun. 2007).

*Primary Examiner* — Clark F Dexter

(57) ABSTRACT

An apparatus and method for faster pathology are provided that removes the need for time consuming preparation of a hardened tissue block. Such hardening is necessary to enable cutting of the thin tissue sections required for pathology evaluation. Rather the tissue specimen is hardened by freezing only at the surface from which tissue is to be sectioned by contact with a cold surface or slide thereby lessening the time required for hardening. Sectioning is performed by passing a cutting device such as a blade, cutting wire or laser beam along a plane parallel to the cold surface and using the cold surface as a guide.

7 Claims, 7 Drawing Sheets

(56) References Cited

U.S. PATENT DOCUMENTS

| | | | | |
|---|---|---|---|---|
| 3,902,390 A * | 9/1975 | Darbo | B26D 1/25 | 83/170 |
| 4,455,910 A * | 6/1984 | Kraft et al. | F16C 32/0674 | 384/12 |
| 5,306,378 A * | 4/1994 | Takimoto et al. | G02B 6/245 | 156/717 |
| 5,550,033 A * | 8/1996 | Krumdieck | G01N 1/36 | 422/536 |
| 6,000,309 A * | 12/1999 | Gnagi | G01N 1/06 | 83/167 |
| 7,789,988 B2 * | 9/2010 | Yamamoto et al. | B29C 63/0013 | 156/247 |
| 8,141,611 B2 * | 3/2012 | Lai et al. | B23D 49/02 | 156/701 |
| 8,635,934 B2 * | 1/2014 | Kong et al. | G01N 1/06 | 83/167 |
| 8,757,607 B1 * | 6/2014 | Benaksas et al. | B26B 29/063 | 269/289 R |
| 8,920,601 B2 * | 12/2014 | Miki et al. | B32B 43/006 | 156/711 |
| 9,217,696 B2 * | 12/2015 | Morales | G01N 1/06 | |
| 2004/0135086 A1 * | 7/2004 | Lewis et al. | G01N 1/06 | 250/339.12 |
| 2010/0058913 A1 * | 3/2010 | Walter | G01N 1/06 | 83/648 |
| 2010/0107834 A1 * | 5/2010 | Lai et al. | B23D 49/02 | 83/15 |
| 2010/0263390 A1 * | 10/2010 | Hofling et al. | G01N 1/06 | 62/64 |
| 2012/0055300 A1 * | 3/2012 | Kong et al. | G01N 1/06 | 83/19 |
| 2012/0104247 A1 * | 5/2012 | Ogawa et al. | G01N 1/06 | 250/288 |
| 2014/0137715 A1 * | 5/2014 | Sneyders et al. | G01N 1/06 | 83/24 |
| 2014/0234895 A1 * | 8/2014 | Morales | G01N 1/06 | 435/40.52 |
| 2015/0338316 A1 * | 11/2015 | Chen | G01N 1/286 | 83/24 |

* cited by examiner

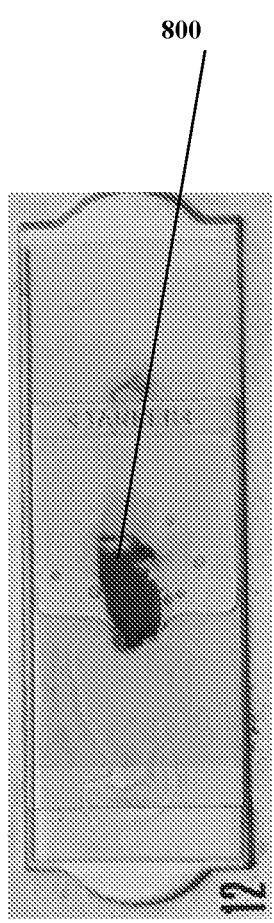 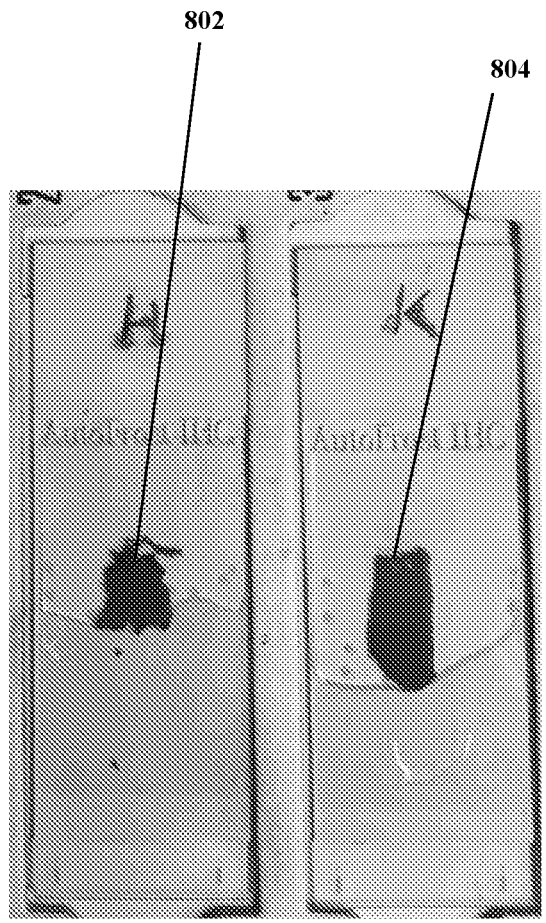 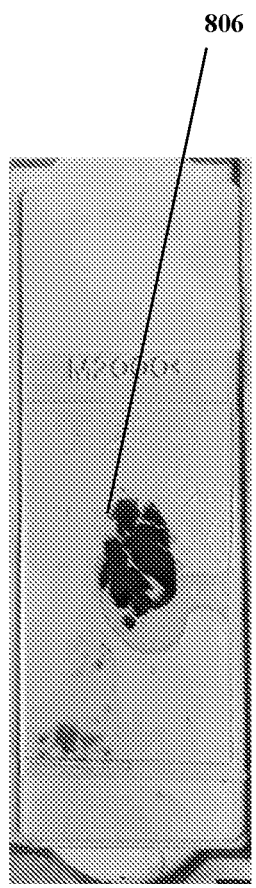
FIG. 8A  FIG. 8B  FIG. 8C  FIG. 8D

APPARATUS FOR FASTER PATHOLOGY

CROSS-REFERENCE TO RELATED APPLICATIONS

The present applications claims priority from and is a continuation of U.S. Provisional Patent Application Ser. No. 62/054,024, filed Sep. 23, 2014, herein incorporated by reference in its entirety.

FIELD OF THE INVENTION

The invention relates generally to a system and a method for faster pathology, and more particularly to a disposable microtome system and method for fast pathology.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Pathology, also known as histopathology or histology, is the gold standard for determining the presence and extent of disease in tissue. Results from pathology are used in making treatment/care decisions and for determining patient prognosis. However, standard pathology is a time consuming and tedious process taking several hours to a few days for results to become available and therefore in many cases treatment must be deferred or delayed. At times during performance of surgical procedures, it is necessary to get a rapid diagnosis of a pathologic process. The surgeon may want to know if the margins of his resection for a malignant neoplasm are clear before closing, or an unexpected disease process may be found and require diagnosis to decide what to do next, or it may be necessary to determine if the appropriate tissue has been obtained for further workup of a disease process.

The tedious methodology of standard pathology demands a hand off of excised tissue to the pathology laboratory for further processing. Typically, tissue specimens are sent from the operating room, medical office or other sites, to a pathology laboratory on one day; the tissue specimens are processed overnight; and the pathologist renders a diagnosis based on microscopic examination of tissue sections the next day at the earliest. In many cases it can take a few days before a diagnosis is available. Despite the use of fiducial markers, tissue painting and notes that sometimes accompany the tissue specimen this hand off precludes the transfer of important observations and considerations about the specimen such as its orientation in the body cavity and relevant features within the body cavity from which it was removed. Information that is relevant to the diagnosis.

Paraffin Embedded Pathology

In one aspect, the invention is related to paraffin embedded pathology. Pathology requires slicing tissue into very thin, approximately 2 to 20 micron sections to produce typically, a one cell thick layer to permit microscopic observation of cellular features. In order to do so the tissue must first be hardened as it is not possible to cut such thin sections from soft tissue. The process of tissue hardening begins by first fixing the tissue to prevent autolytic (degenerative) changes. This is done by placing it, as soon as possible after removal from the body, into 10% formalin; the most commonly used fixative solution for several hours depending upon the size and thickness of the specimen. This is because formalin penetration is slow at approximately 0.5 mm/hour. Next, the tissue is dehydrated by sequentially soaking it in increasingly higher percentages of alcohol or other dehydrating agents, a process that again can take several hours to complete. After this the tissue is cleared by replacing the dehydrating agent with a fluid that is miscible both with the dehydrating agent and embedding medium such as paraffin. Xylene and toluene are commonly used clearing reagents. The tissue sample is next embedded i.e. infiltrated with an embedding medium to that a firm homogenous mass of material containing the tissue sample is obtained. The formed paraffin block, together with the contained tissue is then sectioned (cut) into very thin slices called sections that normally range between 2 and 20 microns in thickness using a microtome. The cut sections are then transferred onto the surface of clean glass microscope slides in a delicate procedure that requires considerable skill.

After the tissue section is mounted on a slide the processing steps must now be reversed to put the tissue back in an aqueous phase for dyeing. This is because most dyes used work only in an aqueous medium. First the paraffin embedding medium is removed by passing the slides together with their mounted sections through xylene or toluene to remove the paraffin and then through descending strengths of alcohol solutions in water, a process that takes several hours. The tissue is now ready for staining which is a process of increasing the visibility of cells by the application of dyes that react with tissue components to form visible substances. A large number of stains are available but generally only two stains are used together to provide contrasting color; one to stain the cytoplasm of cells, the other to stain the nuclei. In certain embodiments, the combination includes the hematoxylin and eosin (H&E) stain. When the stain is applied to a section of tissue the nuclei of component cells appear blue, the cytoplasm and most extracellular materials appear light pink-orange. The slides, together with their mounted, stained sections, are passed back through ascending concentrations of alcohol for dehydration, cleared with some solvent (usually xylene or toluene), and then a permanent mounting medium is put on the tissue section. A thin glass cover slip is then placed on the covering mounting medium and underlying tissue section and allowed to dry. As the histologic preparation dries, the solvent evaporates from the mounting medium, which hardens, permanently cementing and sealing the tissue preparation between the glass slide and overlying cover slip. The mounting medium (balsam, histomount, permount) when dried has nearly the same refractive index as glass. After drying, the histologic section is well protected and if stored properly will usually remain unchanged for several years. The slide is now ready for microscopic examination by a pathologist and for digital scanning.

Frozen Section (FS) Pathology

In another aspect, the invention is related to Frozen Section (FS) pathology. FS pathology is an alternative, faster method of pathology processing that can produce pathology slides in about 20 minutes to an hour. In this method, the tissue specimen is hardened for slicing by snap freezing it instead of embedding it in paraffin. The snap freezing is done by immersing the specimen in cold liquid, for example isopentane mixed with dry ice, or by placing it in a cryostat. Referring to FIG. 1, a cryostat 100 is a refrigerated box 140 containing a microtome 160. The cryostat 100 has a working chamber 120 with a movable cover 122 that opens the working chamber 120. The working chamber 120 includes a cryobar 124. The cryobar 124 is an actively cooled flat metal bar inside the working chamber 120 and is used for general purposes such as keeping a sample at sub-freezing temperatures. The microtome 160 is a blade or knife with which thin sections can be planed off from the frozen tissue sample 510 by moving the frozen tissue sample 510 against the edge of the blade or knife. This movement of the tissue sample can be caused manually via a handwheel 130 or motor-driven. The freezing of the tissue specimen is described below. The temperature inside the cryostat is about −20 to −30° C. and can be controlled by control panels 180.

The tissue specimen 200 is frozen by placing it in a shallow metal well 210 as shown in FIG. 2A which is held at freezing temperature inside the cryostat. The tissue 200 is oriented face down making it stick to the frozen metal surface 212 and the well is then overfilled with OCT (Optimum Cutting Temperature) fluid 220. OCT is a commercially available formulation of water soluble glycols and resins that has the consistency of egg whites and when frozen helps embed the specimen into a solid "ice cube" block. A metal piece with surface ridges 232 called a chuck 230 is placed over the OCT 220 and the entire assembly is frozen. Referring to FIG. 2B, when frozen, the OCT 220 present in its ridges 232 helps the chuck to hold onto the tissue block 202. The tissue block 202 is then tapped free off the metal well 210 and the tissue block 202, now held like a popsicle with the handle 240 and the tissue face 204 exposed, is sectioned with the microtome inside the cryostat 100.

The tissue sections are cut and carefully picked up on a glass slide. The operations of cutting and picking up on the glass slide require significant skill and operator experience. The sections are then immediately fixed in 95% Ethanol solution or acetone. Since the tissue section is only a few microns thick, 1-2 minutes of immersion in fixative solution is sufficient in contrast to the several hours required for fixing in standard pathology. The slides are then directly stained with hematoxylin and eosin (H&E) stain since the tissue is already in aqueous medium and there is no paraffin to be removed. A cover slip is put on the tissue and it is now ready for microscopic examination. The fewer, faster steps required in making FS tissue blocks help make it possible to obtain results during the same procedure or in the same patient visit in which the tissue was excised.

Another important advantage of FS pathology is that it makes it possible to examine tissue and cells in as close to the in-vivo state as possible. In paraffin embedded tissue, many potentially interesting antigens are denatured and their antigenicity destroyed during tissue dehydration and in the formaldehyde fixing process. FS processing preserves most antigens and cellular receptors since no chemical change is subjected upon the tissue. These antigens and receptors are therefore available to be detected by antibodies. Similarly FS processed slides enable high quality gene expression imaging because it leaves nucleic acids intact and extractable. This makes FS the method of choice for tests such as in situ hybridization or transcript profiling.

Despite the many advantages of FS pathology, the technique is considered inferior to the paraffin embedded pathology in its ability to show good tissue morphology. There are many reasons for this some of which are listed in the paragraphs below. Further, since good tissue morphology has historically been the foundation of microscopic analysis in pathology, the opportunities to conduct immuno-histochemical analyses, gene expression analyses and molecular analyses in pathology practice have been greatly hampered.

Reasons for Artifact and Error in FS Pathology:

Operator Skill. The FS process requires considerable operator skill and dexterity. FS is generally conducted in a time constrained environment, with the ever-present pressure to produce a fast result, generally in 20 to 30 minutes. The stress is increased when multiple specimens are delivered by a number of surgeons simultaneously. The quality of slides therefore varies greatly with operator and the stress and frustration often results in substandard preparations. There is a significant need to standardize the FS process.

Tissue striping or smearing. This can result from tissue adhering to the blade such as is common with fatty tissue. FS is particularly hard to do on fatty tissue which doesn't freeze well and is difficult to cut in the "mounted on a chuck" configuration used in modern cryostats.

Variable tissue thickness. It requires considerable skill to obtain the correct tissue thickness in a standard cryostat and to be consistent at it. Histotechnologists are frequently known to complain about varying tissue thickness magically appearing despite the cryostat thickness setting.

Tissue shattering. If the block is too cold, tissue with high water content will have a greater tendency to shatter, like cutting into an ice cube. Tissue shattering is seen as an artifact on FS slides making pathology evaluation challenging.

Wavy lines or chatter. This can occur with touch or collagenous tissue or with a loosely held blade. The blade vibrates while cutting causing a rhythmic pattern of thick and thin tissue.

Non Parallel faces 300. This occurs when the specimen face 204 is at an angle on the chuck 230. Referring to FIGS. 3A and 3B, if this occurs, with the dotted line 310 representing the path the blade would take we see, that different tissue depths will be available for examination on the same slide depending upon whether it is on the left or the right thus requiring examination of several sections in order to completely evaluate the tissue surface or margin. FIG. 3A shows parallel faces 302 with respect to no angle for blade cutting.

Tissue surface irregularities. When disease such as cancer is surgically excised from the body the surface tissue removed is irregular and often curved in shape. In procedures such as Mohs surgery for skin cancer the entire excision surface must be examined to verify removal of the cancer. If, in the embedded tissue, the irregular surface is not flattened making it planar and parallel to the path of the cryostat knife, the surgeon may have to review several subsequent deeper sections until a determination can be made that all of the formerly irregular surface has been evaluated. This challenge exists with both standard and FS pathology processing.

It is therefore desirable to have a method for faster pathology processing of tissue and preferably in the operating room, medical office or facility where the patient is being treated so that treatment can be completed in the same visit or procedure.

Previous Attempts to Overcome the Frozen Section Pathology Problems

The prior art discloses various methods and/or devices which attempt to solve the problems listed above.

For example various methods that involve flattening the tissue prior to embedding by exerting pressure or pushing on the tissue against the bottom surface of the well with "sticks" or with a glass slide or comparable tool have been disclosed. Subsequently, or while this flattening is occurring, the tissue in its embedding media is cooled to the point of freezing (generally −20° C. to −40° C.), essentially forming an "ice cube". Optimal tissue sections are obtained if the exterior part of the tissue, representing the deepest and most superficial portions of the irregularly shaped tissue is totally effaced on the surface of the "ice cube". Further, to make the tissue surface parallel to the surface of the chuck methods such as the Miami Special clamp or the Cryo-Embedder are used. These methods help properly orient the ice cube on the chuck making the popsicle needed for sectioning inside the cryostat. The tissue surface can then be sectioned to obtain preferably a single section that will contain the deepest and most superficial portions of the excision surface for pathological examination.

When tissue is flattened against the surface of the well base the adequacy of "flattening" is difficult to verify until after the ice cube is removed from the well. The "glass slide" methods help obtain verifiable flattening of tissue. In these methods the tissue is placed with the relevant, exterior surface face down onto a glass slide and subsequently pressed onto the glass surface with a "stick" or comparable tool. This pressing is continued while OCT is being applied and the tissue frozen. The undersurface of the glass slide is observed though this process and if the tissue "pulls away" from the slide at any focus, the ice block is thawed and the given area is once again pressed into place against the slide. After the tissue is completely frozen, additional OCT and a metal heat sink are applied for to speed the freezing process and help flatten the tissue. The frozen tissue sample is then gently broken off the slide after warming the undersurface of the slide with the fingertips. The tissue sample is then inverted and mounted onto a metal chuck with additional OCT and heat extraction to make it ready for sectioning.

In another adhesive tape method, adhesive tape is manually applied to the tissue effaced surface of the block prior to sectioning. A specially coated piece of tape is applied over the cut surface of the block with a roller (CryoJane Tape Transfer System™, Leica Biosystems, St Louis). When the next section is cut, the blade passes through the tissue just below the tape which adheres to the section exactly as it was on the block. The tape, with the section, is then placed on a specially coated slide with the section side down and briefly exposed to UV light. The UV light releases the adhesive on the tape, and activates an adhesive on the slide. The tape is then pulled off and the section remains on the slide, exactly as it was on the block. As a result issues with tearing, curling, stretching or distortion of the histological section during the cutting operation is prevented.

In all of the above methods the objective is to obtain a tissue block on a chuck (the popsicle), section the tissue effaced surface of the block, collect the section and transfer it onto a glass slide. All of this is time consuming, prone to error, requires significant skill and needs large equipment such as a cryostat. An alternative method, Touch Preparation cytology or imprint cytology benefits from the fact that adhesion of cancer cells to the tissue matrix is lower than that of normal cells and will preferentially attach to a glass slide or tape when the tissue surface is touched by these. The cells adhering to the glass slide are then fixed in 95% ethanol and stained. Touch cytology thus circumvents the need to freeze, mount and section tissue making it a much faster process that does not require a cryostat. However, given that this is a cytological technique the method only examines in detail the transferred cells. Information about non cellular tissue components or tissue architecture and morphology are not provided by Touch cytology.

SUMMARY OF THE INVENTION

In one aspect, the inventions is related to paraffin embedded pathology.

In another aspect, the invention is related to frozen section pathology.

In a further aspect, the invention relates to various methods and/or devices for solving the problems of the frozen section pathology.

In yet another aspect, the invention relates to a disposable microtome system and method for faster pathology.

In one embodiment, an apparatus is disclosed for directly cutting a tissue section on the flat surface of a slide without having to mount the specimen on a chuck for sectioning in a standard cryostat.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIG. 1 shows a standard cryostat used for making frozen sections, which is a significant piece of equipment in a pathology laboratory and an inside view of the standard cryostat, showing microtome, controls, quick freeze heat extractor and storage. The inside is maintained at subfreezing temperature.

FIG. 2A shows that a specimen is placed face down on the surface of the well which is then overfilled with OCT. A metal chuck is then placed over the OCT and the entire assembly frozen. FIG. 2B shows that the well is "tapped off" exposing the frozen specimen face. The ridges on the chuck help it hold onto the embedded specimen like a popsicle. The exposed specimen face is then sectioned with the microtome.

FIG. 3A shows that the face of the specimen is parallel to the face of the chuck making it easy to obtain the entire tissue margin in one section. FIG. 3B shows that the tissue face (and margin) is at an angle to the chuck face. In this case it may require multiple sections to evaluate the entire tissue margin.

FIG. 4A is a cross-sectional profile view showing blade, travelling from right to left, cutting a section off the tissue placed on the flat solid surface. The thickness of the section is set by the distance the cutting edge of the blade is positioned above the flat surface. FIG. 4B is a top view showing the remaining tissue being simultaneously cut and lifted off the slide surface by the traveling blade. If needed an additional member accompanying the blade edge can be used to hold remaining tissue and help in lifting it off.

FIGS. 8A-8D are top views of tissue sections cut by the microtome according to one embodiment, where FIG. 8A is heart tissue with slight smearing; FIG. 8B is heart tissue showing adequate sectioning; FIG. 8C is kidney tissue showing adequate sectioning; and FIG. 8D is kidney tissue showing fragmentation.

DETAILED DESCRIPTION OF THE INVENTION

Figure 1:
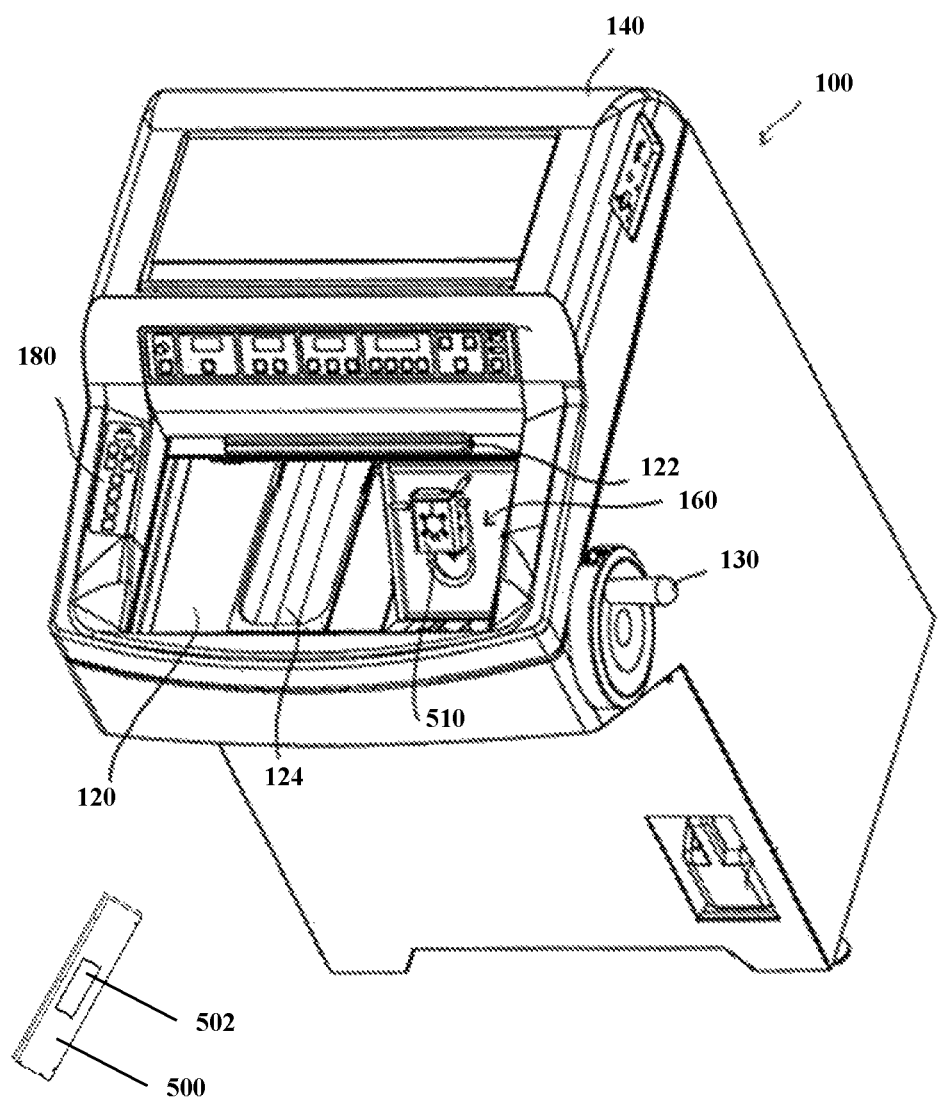
FIG. 1 shows a perspective view of a cryostat.
Figure 2A:
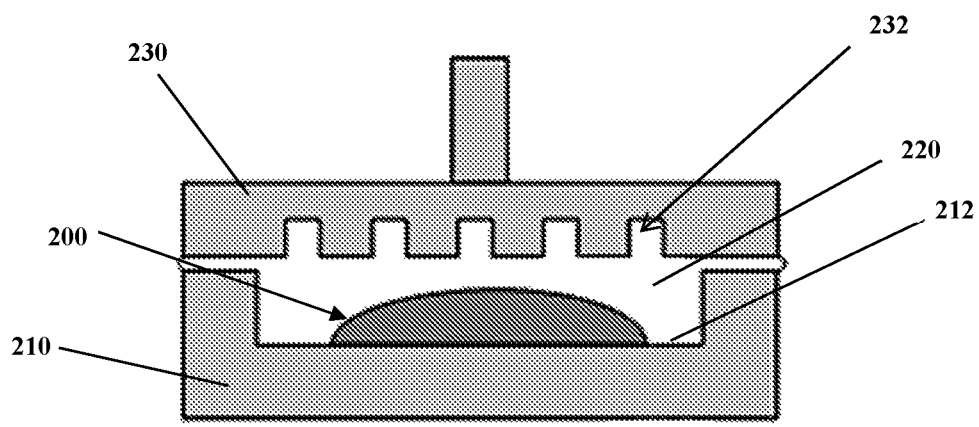
FIGS. 2A and 2B schematically show a method of freezing tissue in Frozen Section (FS) pathology.
Figure 2B:
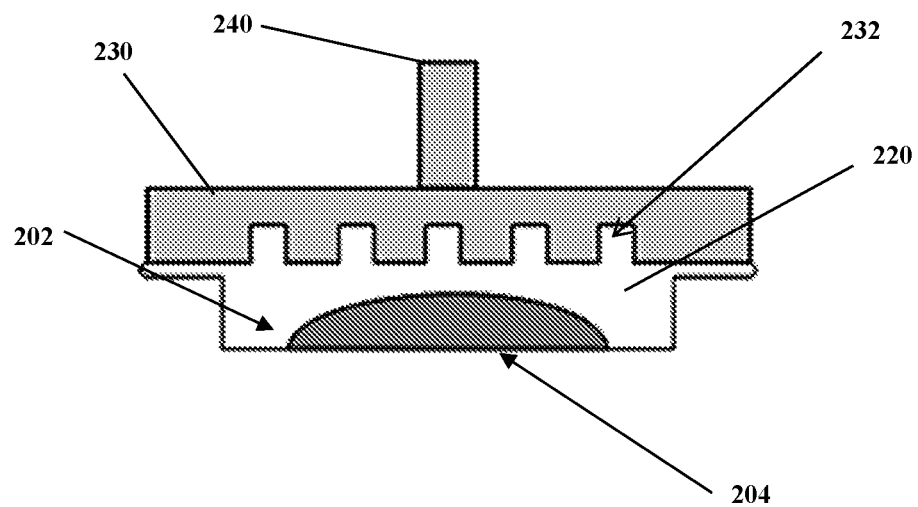
Figure 3A:
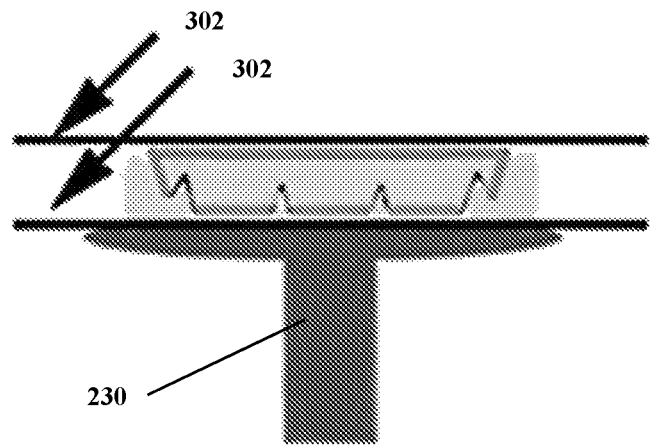
FIGS. 3A and 3B schematically show the FS block on a chuck resembles a popsicle (ice cube on a stick). Proper orientation of the face of the block is important for good sectioning.
Figure 3B:
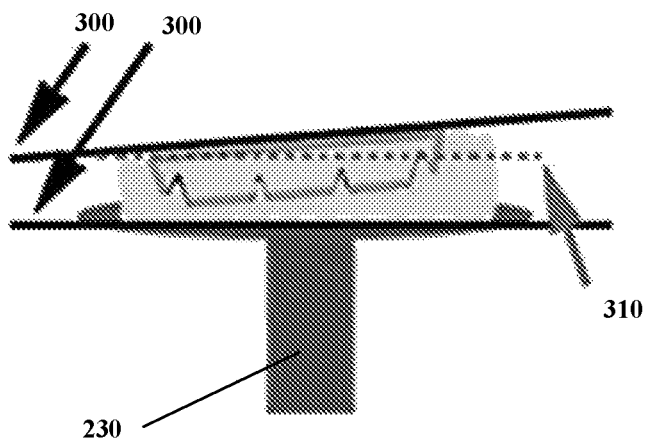

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be further understood that the terms "comprises" and/or "comprising," or "including," and/or "including," or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Disposable Microtome System and Method for Faster Pathology

In one embodiment, a disposable microtome system and method for faster pathology is provided.

In one embodiment, an apparatus to expedite the process of obtaining frozen sections for microscopic evaluation of tissue pathology is provided.

In one embodiment, an apparatus which reduces the number of steps required starting from a fresh tissue sample to obtaining a section on a slide thus reducing reliance on operator skill and improving consistency is provided.

In one embodiment, the artifacts listed above that reduce the quality of pathology slides is reduced or eliminated.

In one embodiment, consistency and uniformity in section thickness is provided so as to reduce errors and artifacts when digitally scanning the slide.

In one embodiment, an apparatus which facilitates manipulation of the tissue sample for optimum sectioning is provided.

In one embodiment, visual inspection of the flattened irregularly shaped surface of the tissue sample to help get the deepest and most superficial portions of the excision surface in a single section is provided.

In one embodiment, a simpler apparatus is provided which is relatively simple to use, economical to manufacture, and particularly well adapted for the proposed usage thereof.

In one embodiment, the surgeon is allowed to help prepare the slides as needed in the operating room while information about the specimen is still fresh in the surgeon's mind and reduces the loss of information from having to hand off the specimen to a distant pathology laboratory.

According to the embodiments disclosed herein, an apparatus is disclosed for directly cutting a tissue section on the flat surface of a slide without having to mount the specimen block on a chuck for sectioning in a standard cryostat.

The apparatus is comprised of a flat solid surface held at subfreezing temperature upon which the operator can place the tissue specimen, face down. The surface of the tissue in contact with the flat surface will adhere to it because of its low temperature. If necessary the said surface can be coated or pretreated to enhance its adhesiveness. The surface is pre-cooled and held at a preset temperature with active electro-thermal cooling or by physical means such as liquid nitrogen or dry ice.

In one embodiment, the cryostat is generally held at −20° C. to −30° C. In another embodiment, a "boost" heat extraction can be applied to further reduce the temperature of the Cryobar to approximately −50° C. Certain tissue types such as breast tissue required a lower temperature than −20° C. to freeze adequately for sectioning, which may be due to the fat content of the tissue. The skeletal muscle on the other hand was able to freeze sufficiently at −20° C. for the purpose of sectioning. In one embodiment, temperature is an important variable that will require controlling and monitoring for different tissue types in the final device. The percentage of fat volume in the total breast tissue volume may vary from 7 to 56% and the percentage of fat weight in the total breast tissue weight may vary from 3.6 to 37.6%, as exemplified in Vandeweyer E1, Hertens D. "Quantification of glands and fat in breast tissue: an experimental determination" Ann Anat. 2002 March; 184(2):181-4, herein incorporated by reference. Other quantification methods of fatty tissue in may be completed by MRI prior to extraction of tissue, as exemplified by Müller H P et al. "Quantification of human body fat tissue percentage by MRI" NMR Biomed. 2011 January; 24(1):17-24, herein incorporated by reference.

Figure 5A:
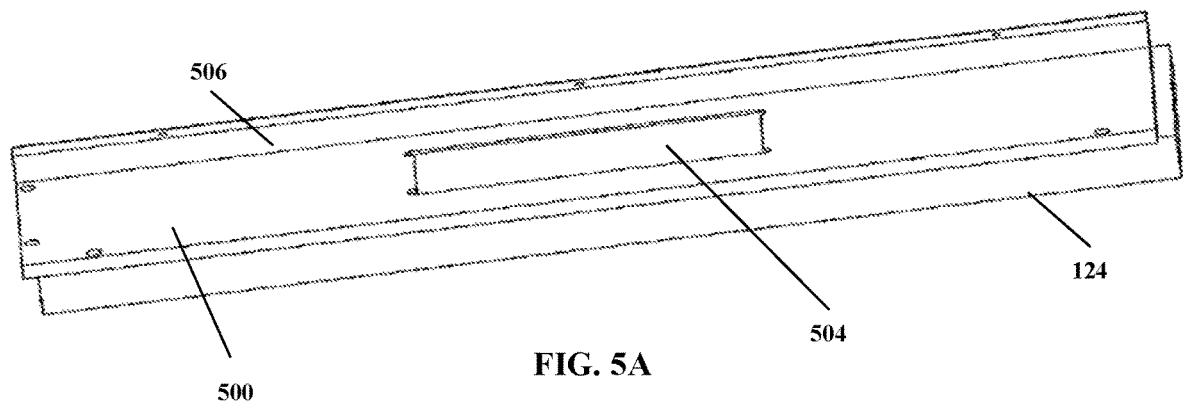
FIG. 5A is a perspective view of the slide holder on top of the cryobar.
Figure 5B:
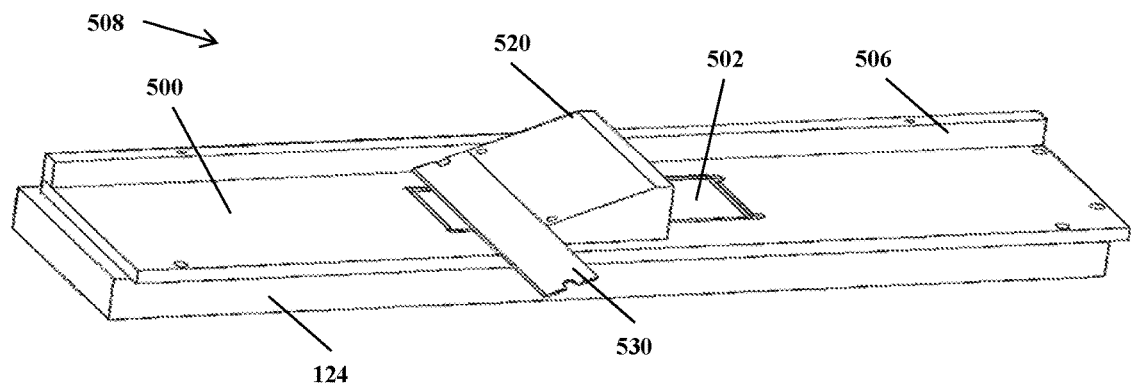
FIG. 5B is a perspective view of a slide blade kit including the blade holder and the blade disposed on top of the slide and slide holder.
Figure 5C:
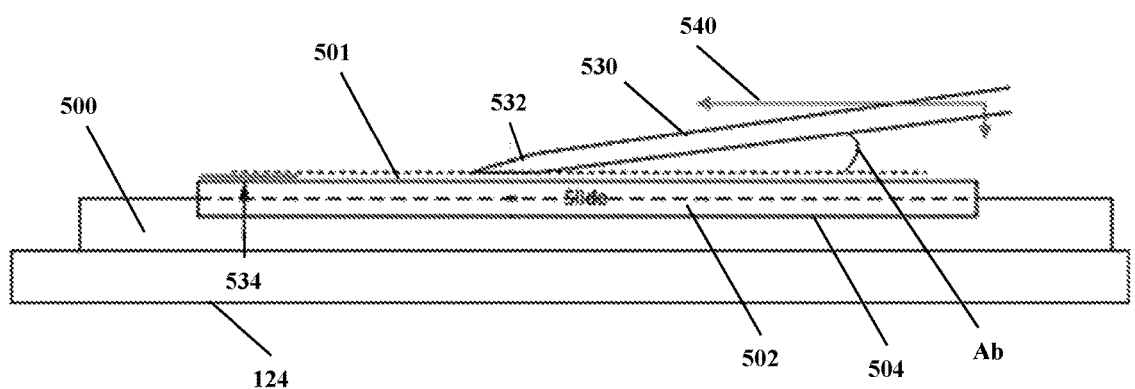
FIG. 5C is a cross-sectional view of the slide blade kit including the blade holder and the blade disposed on top of the slide and slide holder.

In one embodiment, the slide holder is placed in contact with the Cryobar as shown in FIGS. 5A-5C. A fresh slide may be placed on the slot depression in the slide holder and allowed to equilibrate with the Croyobar temperature for about 2-3 minutes. The tissue fragment may be placed on the slide surface and the surface of the tissue touching the slide freezes rapidly in a few seconds. In one embodiment, it is not necessary to wait until the entire specimen froze before running the blade holder (along with blade) through the tissue. When the center of the tissue fragment in contact with the slide was not completely frozen, the tissue fragment may smear upon sectioning. The freezing time is another variable that will require controlling and monitoring. In one embodiment, a camera is placed below the slide and looks up through a small aperture to observe the progress of freezing so as to ensure adequate freezing of tissue at the tissue slide interface.

As needed the operator can ensure that the entire margin or tissue surface of interest adheres to the solid surface by judiciously working around the periphery of the tissue sample and pressing it down onto the slide. This includes removing creases and bubbles as needed.

A cutting member is provided that rides over the flat surface such that it swipes over this surface at a set and constant distance above it thereby cutting through tissue placed on this surface into a thin section. This distance between the cutting member edge and the solid surface can be used to set the thickness of the tissue section. If needed, the cutting member can also be made to move back and forth along the direction of its length so as to provide a slicing action.

Cutting members, such as a cutting wire or laser, can also be used.

OCT can be applied as needed to help sectioning.

The superficial layer, which is the layer of tissue touching the cold solid surface, will freeze rapidly (about 2 to 5 seconds) upon contact with it given the significant temperature differential between the fresh tissue and the cold surface. This rapid freezing of the superficial layer will reduce freeze artifact by formation of vitreous ice crystals which result in fewer artifacts microscopically. Since the tissue section to be cut will be from this superficial layer as the thickness of the section is generally small (a few microns and typically between 2 and 20 microns) it is not necessary to wait until the entire specimen freezes before cutting the section. In standard FS procedure it takes approximately 30 to 90 seconds to freeze the specimen depending upon its size. In one embodiment, the user flattens the superficial layer so as to achieve maximum contact with cold solid surface. In other embodiments, the user may cut a flat surface area for the superficial layer so as to achieve maximum contact with the cold solid surface, which will help stabilize the tissue sample during the cutting procedure. The tissue section that remains on the frozen surface after cutting is subsequently prepared for pathologic examination.

In FS processing as is currently practiced a frozen, freshly cut, tissue section is transferred onto a glass slide. When frozen tissue touches a warm or room temperature slide drying of the tissue starts and it is critical that the slide be fixed instantly to minimize drying artifact from compromising the microscopic quality of the section. In the embodiments disclosed herein, the situation is reversed. Warm tissue is touched upon a frozen surface. This helps reduce drying artifact.

Figure 4A:
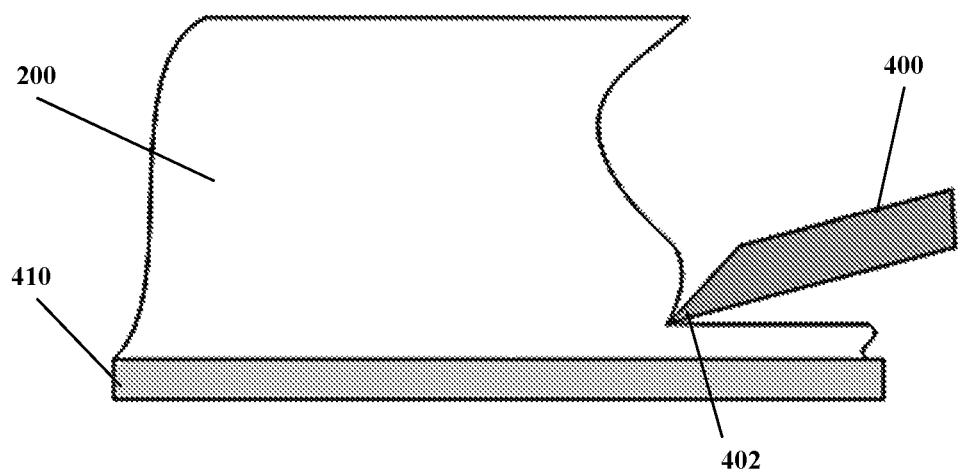
FIGS. 4A-4B shows schematically FS slide preparation according to one embodiment of the present invention.
Figure 4B:
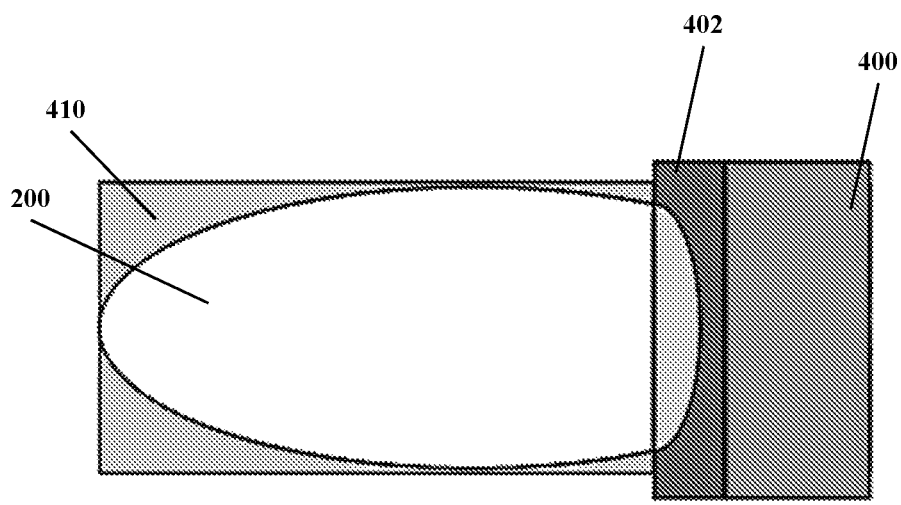

FIGS. 4A-4B schematically shows FS slide preparation according to one embodiment. As shown in FIG. 4B, the top profile view shows that a blade 400 travels from right to left, cutting a section off the tissue 200 placed on the flat solid surface 410. The thickness of the section is set by the distance the cutting edge 402 of the blade is positioned above the flat surface 410. The bottom plot is a top view showing the remaining tissue being simultaneously cut and lifted off the flat surface by the traveling blade. If needed an additional member accompanying the blade edge can be used to hold the remaining tissue and help in lifting it off.

In another embodiment, as shown FIGS. 5A-5B, a slide blade kit 508 includes a slide holder 500 placed on top of the cryobar 124 as previously mentioned. A blade holder 520 may be operably coupled with an engagement system to longitudinally slide the blade holder 520 along the longitudinal axis of the slider holder 500. In one embodiment, the engagement system includes the slide holder 500 which includes a depression feature 504 that holds a slide 502 in place and prevents any movement of the slide 502 during cutting. The slide holder 500 includes a ledge 506 that runs along at least one side of the slide holder 500, such that the blade holder 520 rides and a blade 530 cuts in a straight fashion. The blade holder 520 holds the blade 530 at angle Ab. The blade 530 includes a bevel 532 that is held parallel to the slide surface 502. The applied force is in the direction of arrow 540. In one embodiment, the blade bevel 532 is held above the slide surface 502 by at least one rail 534 along the long edges of the slide. The force range is between about 0.1 and 1.0 N depending upon the type of tissue being cut. The blade holder and the slide holder must also be resistant to pressure and forces of the tissue during cutting.

Alternative engagement systems may be employed so as to permit the straight longitudinal movement of the blade holder 520 and that stabilize the blade holder 520 and to prevent vertical movement of the blade holder 520 during the longitudinal movement of the blade holder 520 during cutting. For example, the blade holder 520 may include a bottom ridged portion that traverses the longitudinal length of the slide holder 500 so as to prevent vertical movement of the blade holder 520. Similarly the blade holder 520 may include a member that rides inside a channel that is provided in the ledge 506 to prevent vertical movement of the blade holder 520. Alternative embodiments may employ at least two ledges or channels on opposite sides of the blade holder 520. Other embodiments may include a distal rail system disposed at a length from the depression holder so as to prevent vertical movement for obtaining a uniform thickness for the tissue section.

The blade angle Ab is another important variable for cutting. Different blade angles may be used ranging from about 17° to 20°. The blade bevel is parallel to the glass slide at the smaller angle. In general, smaller blade angles from about 20 to 100 perform better than larger angles from about 11° to 20° which tended to dislodge the tissue from the glass slide. Smaller angles from about 2° to 10° also allow less force to be used for cutting making for a smooth sectioning experience.

The thickness of the tissue being cut may be varied and controlled by a variety of mechanisms. In one embodiment, the rail 534 includes an adjustable height mechanism (not shown) to raise or lower the height of the bevel 532 above the slide surface. In another embodiment, the depression feature 504 of the slide holder 500 may be adjusted in depth as to lower the slide or heighten the slide along the z-axis. In another embodiment, the blade holder 520 may be adjusted higher or lower along the z-axis as to adjust the thickness of the tissue being cut.

Figure 6:
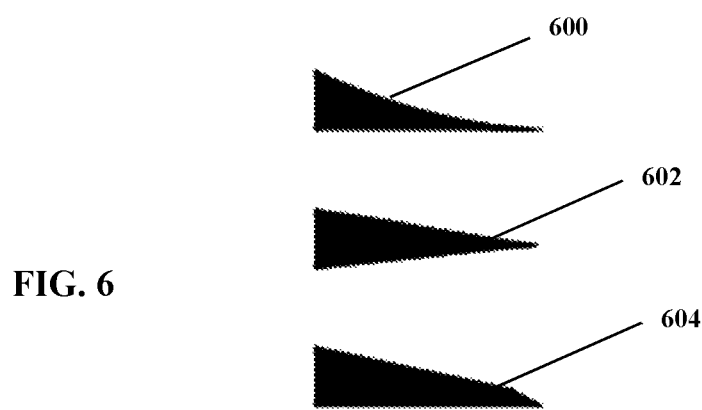
FIG. 6 is a side view of alternative blade profiles.

Several different microtome blades with different profiles may be used, as shown in FIG. 6. A wedge shaped blade 602, a planar concave blade 600, and a chisel shaped blade 604 may be employed. Alternative blade types or a simple wire may provide improved results depending upon the tissue type. Planar concave microtome knives are extremely sharp, but are also very delicate and are therefore only used with very soft samples. The wedge profile knives are somewhat more stable and find use in moderately hard materials. The chisel profile with its blunt edge, raises the stability of the knife, whilst requiring significantly more force to achieve the cut. Glass, carbon, metal, and diamond materials may also make up the blade, which reduce the cut breadth of the blade on the order of a few millimetres. The thickness of the blade may range from about 0.1 mm to 0.9 mm.

Since the blade rides and always cuts parallel to the surface of the solid surface, uniform section thickness can be ensured. This is unlike when cutting the tissue on a standard microtome where small mechanical variations on the chuck positioning can have a significant impact on section thickness. In a standard microtome the section is cut out into free space. The tissue that peels away has very little structural integrity, due to its thinness, and often fragments or folds over itself making histologic interpretation difficult, if not impossible. The embodiments disclosed herein, by having one surface of the section already adhering to the flat surface while cutting, helps the section retain its structural integrity and reduces artifact from fragmenting, striping, shattering or smearing. These benefits are similar to those obtained in the so-called adhesive tape method where adhesive tape is applied to the tissue block to be cut prior to the preparation of the histological section. However, since the adhesive tape is applied to the tissue effaced block mounted on the chuck, the block must still be prepared and tissue cut in a cryostat. The benefits of the embodiments disclosed herein are fewer steps, less equipment, less opportunity for error and a faster slide preparation. Also the adhesive tape does not play a role in keeping the tissue section flat and of uniform thickness.

In the FS processing methods disclosed previously the tissue adhering tissue surface is forcibly separated from the flattening surface after the block is frozen. This brings with it inherent risk the very cancer cells which the surgeon is searching for may remain adhered to that surface and will therefore never make it into the section cut by the microtome. The nature of cancer cells increases the likelihood of this problem because cancer cells are delicate, friable and have compromised structural support as compared to healthy tissue. Further, the microtome operator, when cutting sections from the block may take at least one and often multiple sections that he or she may not be satisfied with (known as attrition) before finally taking a section that is transferred onto a glass slide. Since the surface of tissue effaced on the block is often the excision surface that must be evaluated this practice comes with the risk that several cell layers below that surface are examined while the superficial layers are discarded. The embodiments disclosed herein ensure the superficial layer of the excision surface being the layer the surgeon is most interested in is examined along with any cells that can be lost when processed using current methods.

In the most preferred embodiment, the flat surface is that of a microscope slide made of glass or other suitable optically transparent material at sub-freezing temperatures. The flat surface of the glass or other material can be modified physically and/or chemically to promote adhesion. For example, a soft coating 501 can be applied to help reduce crushing artifact and improve adhesion, as shown in FIG. 5c. Similarly, the slide surface can be coated with chemical agents such as aminoalkylsilane to promote tissue adhesion. A camera can optionally be placed below the slide and looking up at the slide and providing a view of tissue adherence to the slide on a monitor so that the operator can ensure all areas of the tissue are in contact with slide surface.

Applying a protein as contact glue. Typically a mixture of chrome alum and gelatin are used but other combinations are possible. Gelatin forms a gel with chromium. The chromium covalently bonds to the surface of the glass and the gelatin to some proteins in the section. Applying a positively charged coating that attaches to the tissue through negative charges in the tissue. In addition to promoting tissue adhesion the positive charge makes the slide more hydrophilic. This hydrophilicity provides a better base for homogeneous covering by aqueous stains and reagents leading to consistent full slide staining We prepared slides with different tissue types such as Breast, heart and kidney and skeletal muscle. In general we did not see a difference between different slide types although the slides with protein as contact glue seemed to perform slightly better.

In an alternative embodiment, the slide is made of material that is not optically transparent such as solid metal. In this case the section is cut on the flat surface and the surface is allowed to warm. The section is then transferred to a glass slide that is optionally surface treated to promote adhesion. The transfer is done by touching the surface of the glass slide to the surface of the section. Since the warmed metal no longer has the tissue adhesion, the transfer is easy to accomplish.

In one embodiment, the glass slide that serves as the flat surface and blade are combined and assembled in a kit with the blade positioned to travel along the surface of the slide at a distance that determines the thickness of the section. The single use nature of the combination ensures that there is always a fresh, sharp blade available for each section. This helps ensure consistency in sections and prevents cross-contamination from blade re-use. Further, the blade is part of the kit and is not handled separately. A protective shield or barrier over the blade which travels with the blade is provided for protecting the user's hand. The same barrier also helps collect the remainder of the tissue specimen after the section has been cut onto the slide. These methods will make the device safe and prevent the user from inadvertently cutting himself. This is a known problem in the current state of the art where novice users are known to cut themselves while changing the blade or getting in the way of the moving blade during microtome operation.

The disposable kit is used in combination with a refrigerated box. In one embodiment of the box, it is a table top unit that accommodates the single use slide/blade kit and holds the slide at sub-freezing temperature. The unit has controls that actuate the blade movement for slicing through tissue placed on the slide. After the tissue is sectioned the blade is automatically separated from the slide and deposited in a hazardous waste container provided inside the unit. The slide with the section on it can then be easily removed for further processing. Alternatively the unit can be integrated with automated slide processing equipment to speed up the preparation of slides for microscopic evaluation.

The embodiments disclosed herein eliminate a number of steps that require significant operator skill and are well known in the practice of histopathology to cause stress and frustration. These include block preparation, mounting on a chuck, sectioning with a microtome inside a cryostat, using a brush to separate sections from the block and finally picking up a section on a slide. In addition embodiments disclosed herein automate the tissue sectioning process. These features help guarantee a consistent quality in the preparation of tissue sections thereby standardizing the procedure and removing operator introduced variability. These benefits when combined with the small footprint of the refrigeration unit will permit using the device in the operating room thereby reducing the need to hand off tissue and associated information to a distant pathology lab. The slides can be prepared by the surgeon or by the assistant under direction from the surgeon. This will help reduce errors.

Figure 7:
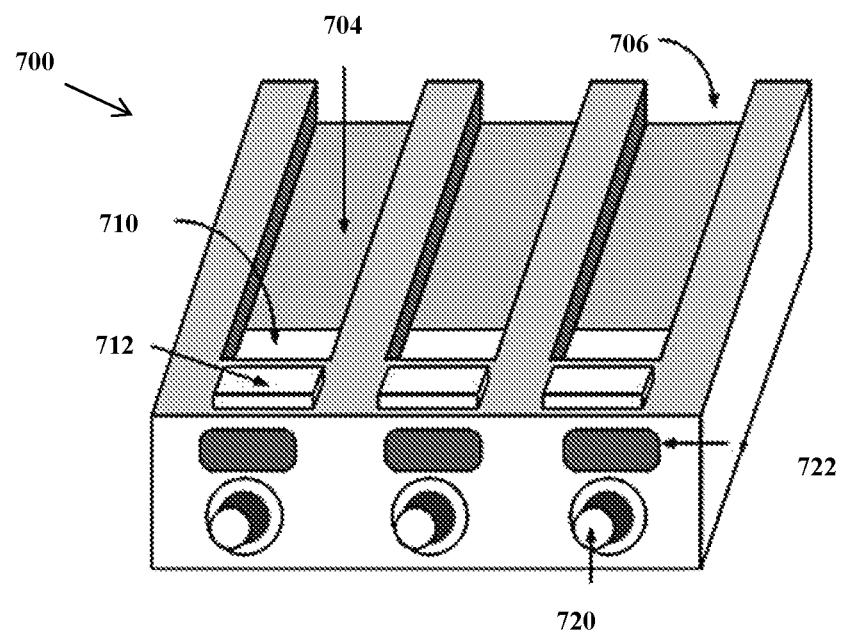
FIG. 7 schematically shows a refrigeration table top unit for accommodating the slide-blade kit according to one embodiment of the present invention.

FIG. 7 schematically shows a microtome assembly in the form of a refrigeration table top unit 700 accommodating the slide-blade kit 508 according to one embodiment. The unit is a low profile table top unit that is easy to use and allows snap on/off installation of the kit and for actuation of the blade. The unit accepts multiple slide/blade kits as shown and after sectioning each slide can be removed and the blade is discarded in a hazards container provided in the unit. The tissue specimen is placed in the slot 704 and the slide blade kit 508 is inserted from the rear section 706. The blade holder 710 is near the front section and may be released by a blade release system 712. The unit 700 includes a temperature control 720 and a temperature display 722 to determine the exact freezing temperature for the tissue specimen.

Results from sectioning using the microtome prototype are shown in FIGS. 8A-8D after staining of the slides. FIGS. 8A-8D are top views of tissue sections cut by the microtome according to one embodiment, where FIG. 8A is heart tissue with slight smearing 800; FIG. 8B is heart tissue showing adequate sectioning 802; FIG. 8C is kidney tissue showing adequate sectioning 804; and FIG. 8D is kidney tissue showing fragmentation 806. In some cases smearing caused in FIG. 8A was most likely from inadequate freezing or lack of adhesion. Similarly in other cases, as shown in FIG. 8D, fragmentation of tissue was seen likely due to inadequate adhesion or from folds in the tissue. Smearing and fragmentation artifacts are common in standard frozen section pathology and do not prevent from obtaining an acceptable pathology evaluation.

The foregoing description of the exemplary embodiments of the invention has been presented only for the purposes of illustration and description and is not intended to be exhaustive or to limit the invention to the precise forms disclosed. Many modifications and variations are possible in light of the above teaching.

Some references, which may include patents, patent applications and various publications, are cited and discussed in the description of this disclosure, which includes, among other things, exhibits and drawings, if any. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

Any type of tissue may be sectioned by the disclosed embodiments.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

The invention claimed is:

1. A microtome assembly, comprising:
    a slide holder that includes a flat surface and a depression disposed within the flat surface for removably mounting a slide and preventing all movement of the slide during a cutting operation, the slide having a surface and a longitudinal length, the slide for receiving a material on the surface thereof;
    a cutting member;

a cutting member holder that holds the cutting member at an angle relative to the flat surface for holding the cutting member at an angle to and at a fixed distance above the surface of the slide; and a refrigerated box that receives the slide holder, wherein the refrigerated box is configured to cool the slide to a temperature of from −10 to −50 degrees Celsius prior to the cutting member sectioning the material received on the surface of the slide;

wherein the slide holder is operably coupled with the cutting member holder to permit actuation of the cutting member holder along the flat surface to move the cutting member along the flat surface at the fixed distance above the surface of and along the longitudinal length of the slide.

2. The microtome assembly of claim 1, wherein the slide holder further comprises at least one rail to hold a cutting edge of the cutting member at the fixed distance above the surface of the slide.

3. The microtome assembly of claim 2, further comprising the slide, and wherein the angle of the cutting member relative to the surface of the slide is between 0 to 17 degrees.

4. The microtome assembly of claim 3, wherein the distance between the cutting edge and the surface of the slide is between 2 to 20 µm.

5. The microtome assembly of claim 3, further comprising a ledge longitudinally disposed along at least one side of the slide holder;

the cutting member holder including an angled surface, a flat surface, and a side surface connecting the angled surface and the flat surface; wherein the side surface substantially engages the ledge to allow longitudinal movement of the cutting member holder relative to the flat surface of the slide holder; and the cutting member operably coupled with the angled surface of the cutting member holder, wherein the cutting member includes a bevel that forms the cutting edge and that is parallel to the surface of the slide.

6. A microtome assembly for the production of thin sections of tissue capable of being examined with microscopy and without having to mount a tissue sample on a block, comprising:

a slide;

a slide holder that includes a flat surface and a depression disposed within the flat surface that removably mounts the slide and prevents all movement of the slide during a cutting operation;

wherein the slide includes a surface and a longitudinal length, and wherein the slide receives tissue on the surface thereof;

a cutting member; and a cutting member holder holding the cutting member at an angle relative to the surface of the slide, the cutting member holder allowing longitudinal movement of the cutting member at a fixed distance above the surface of the slide and along the longitudinal length of the slide;

wherein the slide holder is operably coupled with the cutting member holder to permit movement of the cutting member over the slide;

wherein the slide holder further comprises at least one rail to hold a cutting edge of the cutting member at a fixed distance above the surface of the slide;

wherein the angle of the cutting member includes an angle between 0 to 17 degrees;

wherein the cutting member is selected from the group consisting of a wedge-shaped blade, a planar concave blade, and a chisel-shaped blade;

wherein the surface of the slide includes a coating to promote adhesion of the tissue sample to the surface of the slide; and wherein the microtome assembly includes a refrigerated box that receives the slide holder and the slide, and the refrigerated box is configured to cool the slide to temperatures between −10 to −50 degrees Celsius.

7. The microtome assembly of claim 6, further comprising a ledge longitudinally disposed along at least one side of the slide holder;

the cutting member holder including an angled surface, a flat surface, and a side surface connecting the angled surface and the flat surface;

wherein the side surface substantially engages the ledge to allow longitudinal movement of the cutting member holder along the flat surface of the slide holder; and the cutting member operably coupled with the angled surface of the cutting member holder, wherein the cutting member includes a bevel that forms the cutting edge and that is parallel to the slide surface of the slide.

* * * * *